(12) United States Patent
Mani et al.

(10) Patent No.: US 8,838,546 B1
(45) Date of Patent: Sep. 16, 2014

(54) CORRECTING ACCIDENTAL SHORTCUT USAGE

(75) Inventors: Jai John Mani, San Francisco, CA (US); Brandon Kyle Bilinski, Mountain View, CA (US)

(73) Assignee: Google Inc., Mountain View, CA (US)

( * ) Notice: Subject to any disclaimer, the term of this patent is extended or adjusted under 35 U.S.C. 154(b) by 39 days.

(21) Appl. No.: 13/572,000

(22) Filed: Aug. 10, 2012

(51) Int. Cl.
*G06F 17/30* (2006.01)

(52) U.S. Cl.
USPC ............... 707/684; 714/19; 715/827; 715/847

(58) Field of Classification Search
USPC .................. 707/758, 805, 684; 715/847, 827; 714/19
See application file for complete search history.

(56) References Cited

U.S. PATENT DOCUMENTS

| | | | |
|---|---|---|---|
| 6,542,170 B1 * | 4/2003 | Williams et al. | 715/816 |
| 6,543,006 B1 * | 4/2003 | Zundel et al. | 714/19 |
| 6,668,338 B1 * | 12/2003 | Todd et al. | 714/19 |
| 7,549,130 B2 * | 6/2009 | Keim | 715/847 |
| 7,757,185 B2 | 7/2010 | Paquette et al. | |
| 2007/0044039 A1 * | 2/2007 | Amadio et al. | 715/847 |
| 2007/0098263 A1 | 5/2007 | Furukawa et al. | |
| 2007/0162875 A1 | 7/2007 | Paquette et al. | |
| 2007/0192747 A1 * | 8/2007 | Phelan et al. | 715/847 |
| 2009/0055777 A1 * | 2/2009 | Kiesewetter | 715/847 |
| 2010/0280821 A1 | 11/2010 | Tiitola | |
| 2010/0287507 A1 | 11/2010 | Paquette et al. | |
| 2011/0209087 A1 | 8/2011 | Guyot-Sionnest | |

\* cited by examiner

*Primary Examiner* — Robert Beausoliel, Jr.
*Assistant Examiner* — Alexandria Bromell
(74) *Attorney, Agent, or Firm* — Shumaker & Sieffert, P.A.

(57) ABSTRACT

A method includes receiving, at one or more computing devices, user input indicative of a plurality of text characters, wherein at least one text character from the plurality of text characters is operable to cause execution of a shortcut function of an application; determining, at the one or more computing devices, whether the plurality of text characters at least partially matches one or more words from a word list; and executing, at the one or more computing devices, an undo function of the application in response to the shortcut function if the plurality of text characters at least partially matches one or more words from the word list.

14 Claims, 7 Drawing Sheets

CORRECTING ACCIDENTAL SHORTCUT USAGE

BACKGROUND

Shortcut commands are implemented as part of the user interface of some computer applications. One type of shortcut command is referred to as a "keyboard shortcut" or a "hotkey." In some implementations, a keyboard shortcut or hotkey is a key or a predefined combination of keys that, when pressed by the user, cause a computing device to execute one or more predefined functions and/or operations.

In computer applications where functions or operations can be executed in response to shortcut commands, accidental usage of shortcut commands can lead to unintended results, such as accidental deletion of files or data. As an example, if a user intends to type a sentence into a search field but the search field has not been selected or otherwise brought into focus, some applications will interpret the input as shortcut commands. In response to these commands, the applications could perform multiple actions such as deleting items. In some situations, undo functions may be available to return the application to the state that it was in prior to execution of the shortcut commands. However, where multiple shortcut commands are received by the application and functions are executed in response thereto, the application may only be able to undo a limited number of the functions that have been executed.

SUMMARY

One aspect of the disclosed technology is a method that includes receiving, at one or more computing devices, user input indicative of a plurality of text characters, wherein at least one text character from the plurality of text characters is operable to cause execution of a shortcut function of an application. The method also includes determining, at the one or more computing devices, whether the plurality of text characters at least partially matches one or more words from a word list. The method also includes executing, at the one or more computing devices, an undo function of the application in response to the shortcut function if the plurality of text characters at least partially matches one or more words from the word list.

Another aspect of the disclosed technology is a non-transitory computer readable medium including program instructions executable by one or more processors that, when executed, cause the one or more processors to perform operations. The operations include receiving user input indicative of a plurality of text characters, wherein at least one text character from the plurality of text characters is operable to cause execution of a shortcut function of an application. The operations also include determining whether the plurality of text characters at least partially matches one or more words from a word list. The operations also include executing an undo function of the application in response to the shortcut function if the plurality of text characters at least partially matches one or more words from the word list.

Another aspect of the disclosed technology is a method that includes receiving, at one or more computing devices, user input indicative of a plurality of text characters, wherein at least one text character from the plurality of text characters is operable to cause execution of a shortcut function of an application. The method also includes determining, at the one or more computing devices, whether the plurality of text characters at least partially matches one or more words from a word list. The method also includes executing, at the one or more computing devices, the shortcut function if the plurality of text characters does not at least partially match one or more words from the word list.

Another aspect of the disclosed technology is a non-transitory computer readable medium including program instructions executable by one or more processors that, when executed, cause the one or more processors to perform operations. The operations include receiving user input indicative of a plurality of text characters, wherein at least one text character from the plurality of text characters is operable to cause execution of a shortcut function of an application. The operations also include determining whether the plurality of text characters at least partially matches one or more words from a word list. The operations also include executing, at the one or more computing devices, the shortcut function if the plurality of text characters does not at least partially match one or more words from the word list.

BRIEF DESCRIPTION OF THE DRAWINGS

The description herein makes reference to the accompanying drawings wherein like reference numerals refer to like parts throughout the several views, and wherein.

DETAILED DESCRIPTION

The disclosed technology corrects or suppresses accidental usage of shortcuts. In instances where a user intends to type words into an input field but is instead actually typing shortcut commands, the input can be monitored to determine the user's actual intention, and prevent or correct execution of shortcut commands where entry of those commands was unintentional. For example, when user input indicative of a plurality of text characters is received, it can be determined whether the text characters at least partially match one or more words from a word list. Is so, it can be inferred that the user does not intend to execute shortcut commands. In response, execution of the shortcut command can be suppressed, or if the command has already been executed, and undo function can be performed automatically to return the program to the state that it was in before the unintended shortcut command was executed.

Figure 1:
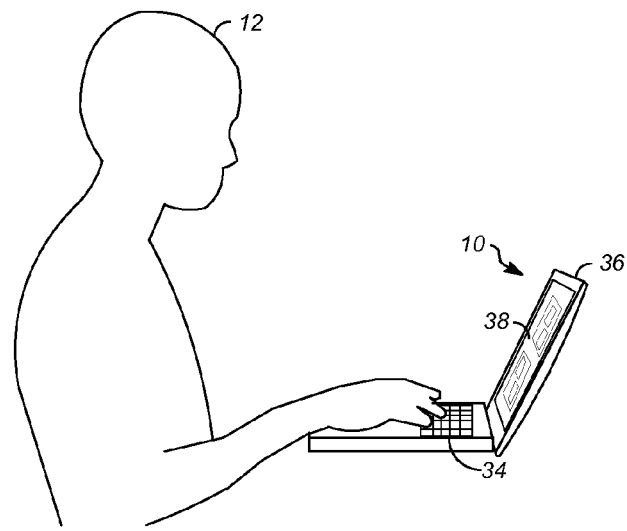
FIG. 1 is an illustration showing a host computing device that is utilized by a user.

FIG. 1 is an illustration showing a host computing device 10 that is utilized by a user 12. A host application 38 that is executed by the host computing device 10 is responsive to input received at an input device 34, such as a keyboard. The user inputs can include entry of words and other text as well as shortcut commands that cause the application to execute specific functions.

Figure 2:
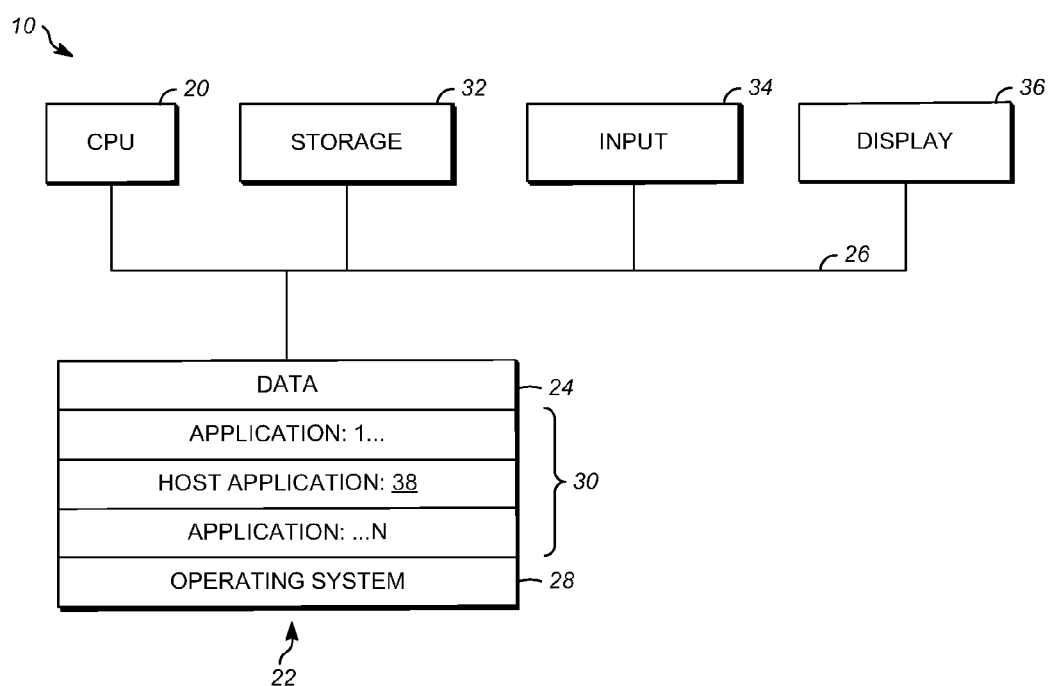
FIG. 2 is a block diagram showing an example of a host computing device.

FIG. 2 is a block diagram of an example of a host computing device 10 that can be utilized to implement a system for correcting accidental shortcut usage. The host computing device 10 can be in the form of a computing system including multiple computing devices, or in the form of a single computing device, for example, a mobile phone, a tablet computer, a laptop computer, a notebook computer, a desktop computer, and the like.

In some examples, the CPU 20 in the host computing device 10 can be a conventional central processing unit. In other examples, that CPU 20 can be an ASIC, and FPGA or other manner of processor. In other examples, the CPU 20 can be any other type of device, or multiple devices, capable of manipulating or processing information now-existing or hereafter developed. Although the disclosed examples can be practiced with a single processor as shown, e.g. CPU 20, advantages in speed and efficiency can be achieved using more than one processor.

The host computing device 10 can include memory 22, such as a random access memory device (RAM), a read only memory device (ROM), a flash memory device, or any other structure suitable for storing information. The memory 22 can include code and data 24 that can be accessed by the CPU 20 using a bus 26. The memory 22 can further include an operating system 28 and application programs 30. The application programs 30 can include programs that permit the CPU 20 to perform the methods described here. For example, the application programs 30 can include applications 1 through N which further include a host application 38 that implements correction of accidental shortcut usage, as will be described in detail herein.

A storage device 32 can be optionally provided in the form of any suitable computer readable medium, such as a hard disk drive, a solid state disk (SSD) drive, a memory device, a flash drive or an optical drive. One or more input devices 34, such as a keyboard, a mouse, or a gesture sensitive input device, receive user inputs and can output signals or data indicative of the user inputs to the CPU 20. One or more output devices can be provided, such as a display device 36. The display device 36, such as liquid crystal display (LCD) or a cathode-ray tube (CRT), allows output to be presented to the user, for example, in response to receiving a video signal.

Although FIG. 2 depicts the CPU 20 and the memory 22 of the computing device 10 as being integrated into a single unit, other configurations can be utilized. The operations of the CPU 20 can be distributed across multiple machines (each machine having one or more of processors) which can be coupled directly or across a local area or other network. The memory 22 can be distributed across multiple machines such as network-based memory or memory in multiple machines performing the operations of the host computing device 10. Although depicted here as a single bus, the bus 26 of the host computing device 10 can be composed of multiple buses. Further, the storage device 32 can be directly coupled to the other components of the host computing device 10 or can be accessed via a network and can comprise a single integrated unit such as a memory card or multiple units such as multiple memory cards. The host computing device 10 can thus be implemented in a wide variety of configurations.

Figure 3:
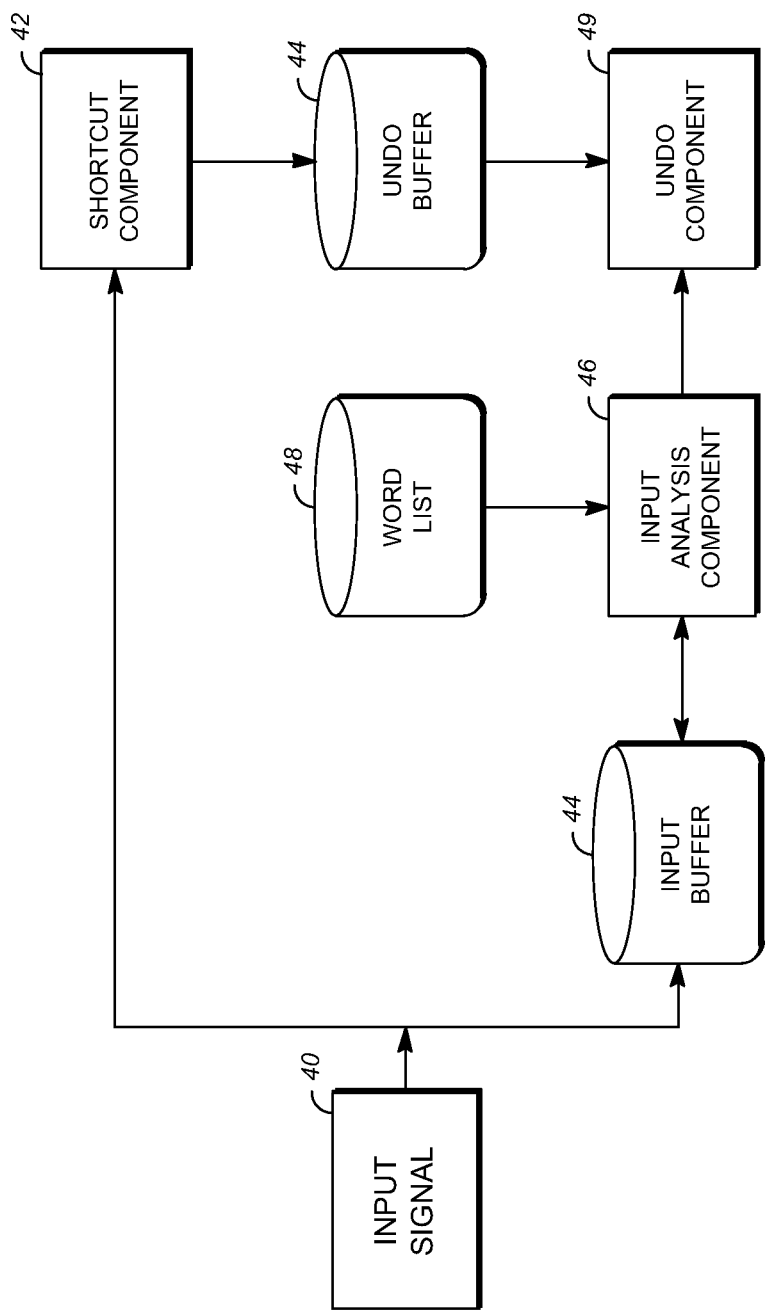
FIG. 3 is a block diagram showing a first example of an implementation of correcting accidental shortcut usage.

FIG. 3 shows an example of a system for correcting accidental shortcut usage that can be implemented by, for example, the host application 38. All or part of this system can be implemented as computer executable instructions that are embodied in a computer readable media, such as the memory 22 or the storage device 32 and are executable by, for example, the CPU 20.

An input signal 40 can be generated and received in response to user input. As one example, the input signal can correspond to one or more shortcut commands. As another example, the input signal can be in the form of one or more text characters. The input signal 40 can be generated by the input device 34 of the host computing device 10 and can be received at the CPU 20. In one implementation, the input device 34 is a keyboard, and the input signal 40 is generated in response to one or more key presses that are received at the keyboard, and which represent one or more characters, such as alphanumeric text characters.

The input signal 40 can be simultaneously provided to a shortcut component 42 and an input buffer 44. The shortcut component 42 can cause one or more operations or functions to be performed by the application. These operations or functions, which may be referred to herein as shortcut functions, can be application-specific operations or functions. In one example of an implementation of this system, the host application 38 is a music player application, and the shortcut component 42 can be operable to perform operations such as starting or stopping playback of music, changing to a different music track, or deleting a music file from the user's library of music.

Information representing or describing the operations that are performed by the shortcut component 42 can be stored in an undo buffer 45. The undo buffer 45 can maintain a record of recently-performed operations or functions and can include information from which the operating state of the host application 38 can be reverted to a previous operating state.

The input buffer 44 is operable to store information describing the input signal 40. The input buffer 44 can include information that describes the input signal 40 over a given period. This can be, in some implementations, a predefined time period. In other implementations, the input buffer 44 can maintain information corresponding to a predetermined number of key presses or shortcut commands. In other implementations, the input buffer 44 can maintain a record of all of the key presses or shortcut commands that are represented by the input signal 40 and that are received during the operation of the host application 38.

An input analysis component 46 utilizes the contents of the input buffer 44 as a basis for determining whether the input signal 40 is valid. The input analysis component 46 can produce an output corresponding to whether or not the input signal 40 represents a valid attempt to execute one or more shortcut commands.

In order to validate the input signal 40, the input analysis component 46 can compare at least a portion of the contents of the input buffer 44 to a word list 48. The word list 48 can be a predetermined word list that includes words or portions of words that are recognized as not corresponding to valid attempts to utilize shortcut commands.

In one implementation, the word list 48 can be a predetermined word list that is based on a dictionary. The contents of the predetermined word list can be selected based on the application. For example, if the host application 38 is a music player application, the predetermined word list can be defined in part using a public repository of music metadata. In another implementation, the word list 48 can be defined based on data that is associated with the host application 38. In an example where the host application 38 is a music player application, the host application 38 can generate the word list 48 based on data such as metadata that is associated with the music tracks that are included on the user's music library. Other types of data can be used by the host application 38 as a basis for generating the word list 48, based on the type of functions that are performed by the host application 38 in a given example.

In one implementation, the input analysis component 46 can determine that the input signal 40 represents a valid attempt to use a shortcut command if a plurality of text characters that are contained in the input buffer 44 does not at least partially match one or more word from the word list 48. The input analysis component 46 can determine that the input signal 40 does not represent a valid attempt to utilize shortcut commands if the plurality of text characters that are contained in the input buffer 44 at least partially matches one or more words from the word list 48. Based on this determination, the input analysis component 46 infers that the user intended to type the word, as opposed to executing a shortcut command.

The input analysis component 46 can output an instruction to an undo component 49 that is operable to execute an undo function. The instruction that is output by the input analysis component 46 can generated in response to determining that the plurality of text characters in the input buffer 44 at least partially matches one or more words from the word list 48 and can instruct execution of the undo component 49 in response to this determination.

The undo component 49 can revert the state of the host application 38 based on information that is contained in the undo buffer 45. As one example, the undo component 49 can return the host application 38 to a prior state of operation that is described by the undo buffer 45. As another example, the undo component 49 can analyze the functions that were performed by the shortcut component 42, as recorded in the undo buffer 45 and perform inverse functions in order to return the operating state of the host application 38 to its previous state.

In some implementations, operation of the undo component 49 can occur without user intervention. In other implementations, operation of the undo component 49 can include displaying an indication to the user of the host application 38 that requests permission to revert the state of the host application 38 to a prior state. This can be in the form of a dialogue box that is presented to the user upon execution of the undo component 49 and requires user confirmation before the state of the host application 38 will be reverted to its prior state. If the user confirms that the shortcut command entry was made in error, the undo component can revert the state of the host application 38 based on the undo buffer 45.

Figure 4:
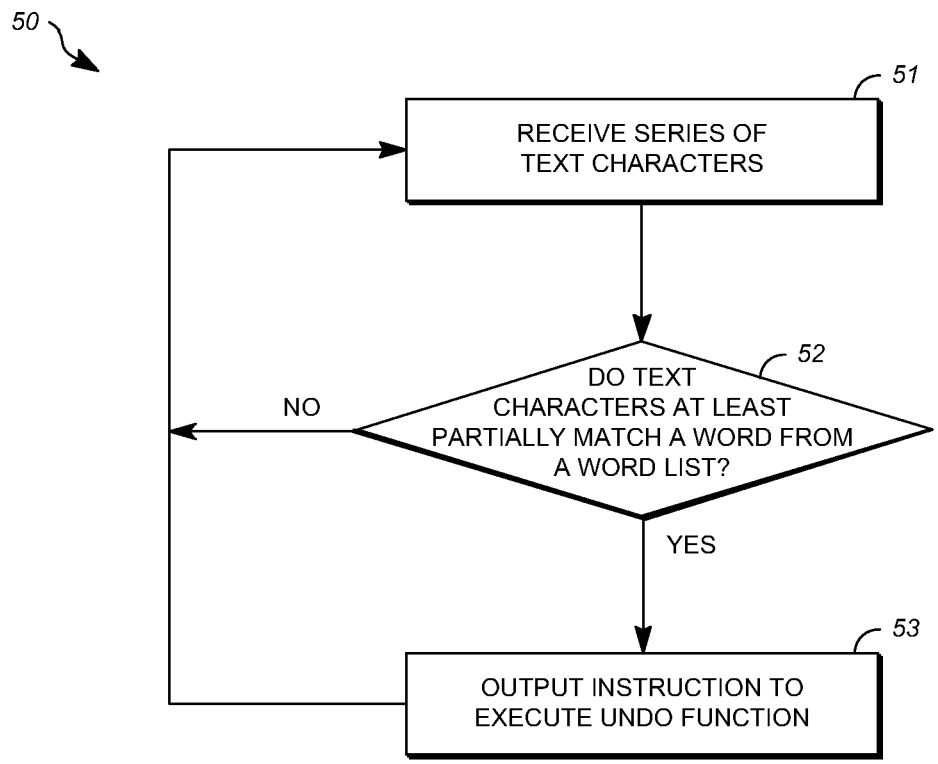
FIG. 4 is a flow chart showing a shortcut handling process according to the first example.

FIG. 4 is a flowchart showing a shortcut handling process 50 for correcting accidental shortcut usage that can be implemented by the system of FIG. 3. The shortcut handling process 50 can be implemented, for example, as a program implemented in the form of hardware or software that is executed by one or more computing devices. In one implementation, the shortcut handling process 50 is implemented in the form of the host application 38, and is executed by the host computing device 10. As an example, the program can include machine-readable instructions that are stored at a computer readable media such as the memory 22 or the storage device 32, and that when executed by a processor, such as the CPU 20, cause the host computing device 10 to perform the shortcut handling process 50. The shortcut handling process 50 can also be implemented using specialized hardware. As explained above, some computing devices may have multiple memories and multiple processors, and the steps of the shortcut handling process 50 can in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

At operation 51, a plurality of text characters is received. In one example, the plurality of text characters is received at the host computing device 10 in response to user input that is received at the input device 34 in response to user operation of the input device 34. At least one text character of the plurality of text characters is operable to cause execution of a shortcut function of the host application 38. In response to the plurality of text characters, the shortcut function can be executed, for example, by the shortcut component 42. The plurality of text characters can be received in any form, such as, for example, by transmission over a network, as an input signal from a device, or by retrieval from memory. Other examples are possible.

At operation 52, a determination is made as to whether the plurality of text characters at least partially matches one or more words from a word list. This can be performed, for example, by execution of the input analysis function of the input analysis component 46. If the plurality of text characters does not at least partially match one or more words from a word list, the plurality of text characters is determined to represent a valid attempt to utilize shortcut commands, and the process returns to operation 51. If the plurality of text characters at least partially matches one or more words from the word list, the plurality of text characters is determined to not represent a valid attempt to utilize shortcut commands, and the process proceeds to operation 53.

At operation 53 an instruction is output to execute the undo function. The undo function can be executed, for example, by the undo component 49. This can include returning the host application 38 to its previous state, as it existed prior to execution of the shortcut functions that were executed in response to the plurality of text characters. An instruction can be output as any type of signal or data or other form, and can be output by triggering execution of an operation, function, process or other type of mechanism, whether implemented in the same application or a different application, either at the same computing device or at a different computing device. The process then returns to operation 51.

Figure 5:
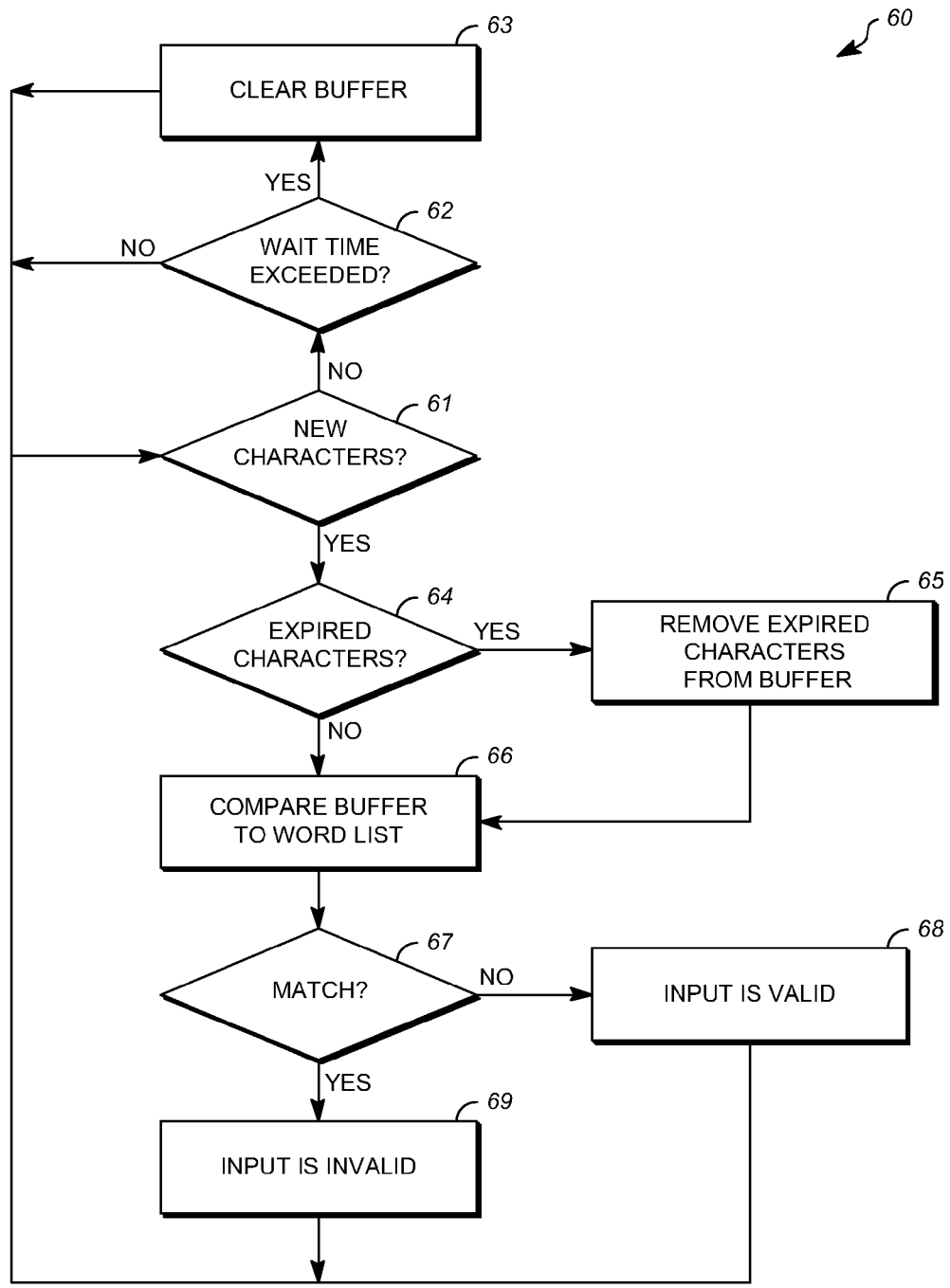
FIG. 5 is a flow chart showing an input analysis process.

FIG. 5 is a flowchart showing an input analysis process 60 for analyzing the input signal 40 based on the contents of the undo buffer 45 in the system of FIG. 3. The input analysis process 60 can be implemented by the input analysis component 46, which can be implemented, for example, as a program implemented in the form of hardware or software that is executed by one or more computing devices. In one implementation, the input analysis process 60 is implemented in the form of the host application 38, and is executed by the host computing device 10. As an example, a program can include machine-readable instructions that are stored at a computer readable media such as the memory 22 or the storage device 32, and that when executed by a processor, such as the CPU 20, cause the host computing device 10 to perform the input analysis process 60. The input analysis process 60 can also be implemented using specialized hardware. As explained above, some computing devices may have multiple memories and multiple processors, and the steps of the input analysis process 60 can in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

At operation 61, the input analysis component 46 determined whether new characters have been added to the input buffer 44. If no new characters have been added to the input buffer, the process proceeds to operation 62. In operation 62, it is determined whether a predetermined wait time period has been exceeded. The predetermined wait time period is utilized as a basis for selectively clearing the contents of the input buffer 44, and the duration of the predetermined wait time is selected in order to differentiate shortcut command entry from other types of text character input, such as typing a word or phrase, by inferring that a long pause between successive keystrokes does not correspond to typing a word or phrase. As an example, the predetermined wait time can be equal to or greater than 300 milliseconds. If the time elapsed is greater than the predetermined wait time, the process advances to operation 63. Otherwise, the process returns to operation 61. In operation 63, the contents of the input buffer 44 are cleared, and the process returns to operation 61.

In response to determining that new characters have been added to the input buffer 44 at operation 61, the process proceeds to operation 64. At operation 64, it is determined whether any of the characters in the input buffer 44 have expired. This can be based on a predetermined maximum number of characters in the input buffer 44, a predetermined time period for each of the characters in the input buffer 44, or any other factor. If one or more of the characters in the input buffer 44 are expired, the process advances to operation 65, where the expired characters are removed from the input buffer 44. After removing the expired characters from the input buffer 44 at operation 65 or after determining that there are no expired characters in the input buffer 44 at operation 64, the process advances to operation 66.

At operation 66, the contents of the input buffer 44 are compared to the word list 48. At operation 67, it is determined whether a plurality of text characters that are contained within the input buffer 44 at least partially match one or more words from the word list 48.

If no match is found at operation 67, the process continues at operation 68, where it is judged that the input signal 40 represents a valid attempt to execute a shortcut command. A signal indicating that the input signal 40 represents a valid attempt to execute a shortcut command can be output by the input analysis component 46. The process then returns to operation 61.

If at least a partial match between the plurality of text characters in the input buffer 44 and the word list 48 is found at operation 67, the process advances to operation 69. At operation 69, it is determined that the input signal 40 corresponds to an invalid attempt to execute a shortcut command and that the user did not intend to execute a shortcut command. A signal indicating that the input signal 40 represents an invalid request to execute a shortcut command can be output by the input analysis component 46. The process then returns to operation 61.

Figure 6:
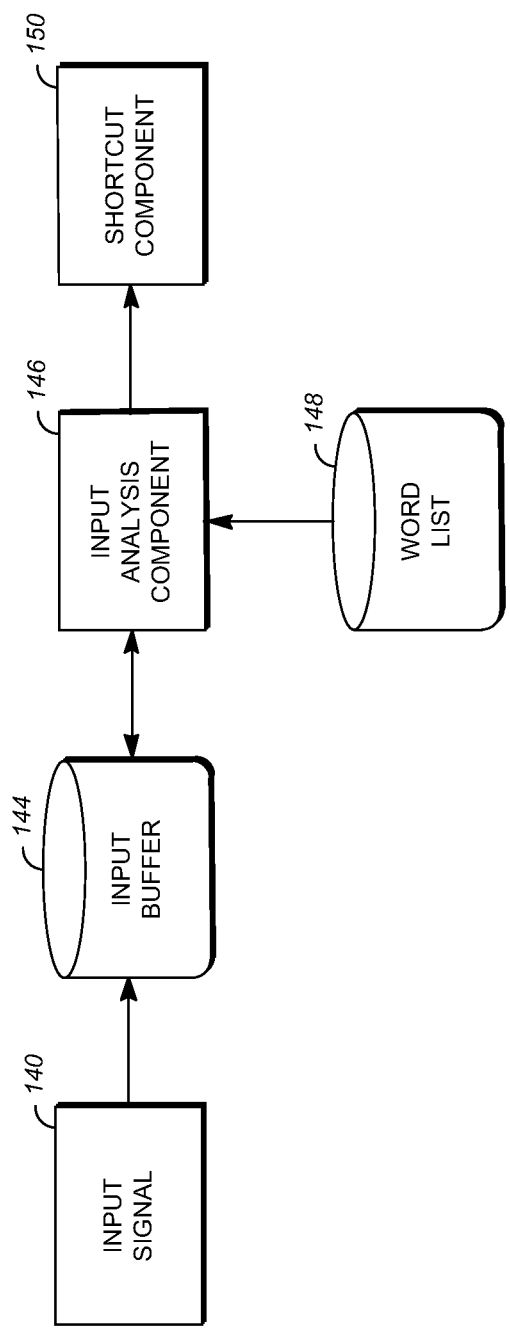
FIG. 6 is a block diagram showing a second example of an implementation of correcting accidental shortcut usage.

FIG. 6 shows a system for correcting accidental shortcut usage according to a second example. The system of FIG. 6 can be implemented by the host computing device 10 of FIG. 2. In this system, an input signal 140 is provided to an input buffer 144. The contents of the input buffer 144 are evaluated by an input analysis component 146 using a word list 148. The input signal 140, the input buffer 144, the input analysis component 146, and the word list 148 are analogous to the input signal 40, the input buffer 44, the input analysis component 46, and the word list 48 of FIG. 3, except as otherwise described herein.

The input analysis component 146 differs from the input analysis component 46 of FIG. 3 in that an output of the input analysis component 146 is provided to a shortcut component 150. The shortcut component 150 is similar to the shortcut component 42 of FIG. 3, except that it is selectively executed based on output provided by the input analysis component 146, instead of being executed directly in response to the input signal 40.

The input analysis component 46 makes a determination as to whether the input signal 140 represents a valid attempt to utilize a shortcut command, in the manner previously described. If the input analysis component 146 determines that the input signal 140 corresponds to a valid attempt to execute a shortcut command, the input analysis component 146 outputs an instruction to the shortcut component 150 to execute the shortcut function corresponding to the input signal 140. If the input analysis component 146 determines the input signal 140 does not correspond to a valid attempt to utilize a shortcut command, the input analysis component 146 can output a signal indicating that no shortcut function is to be executed by the shortcut component 150 in response to the input signal 140. As one example, this output can be the absence of a signal that would otherwise cause execution of the shortcut component 150.

Figure 7:
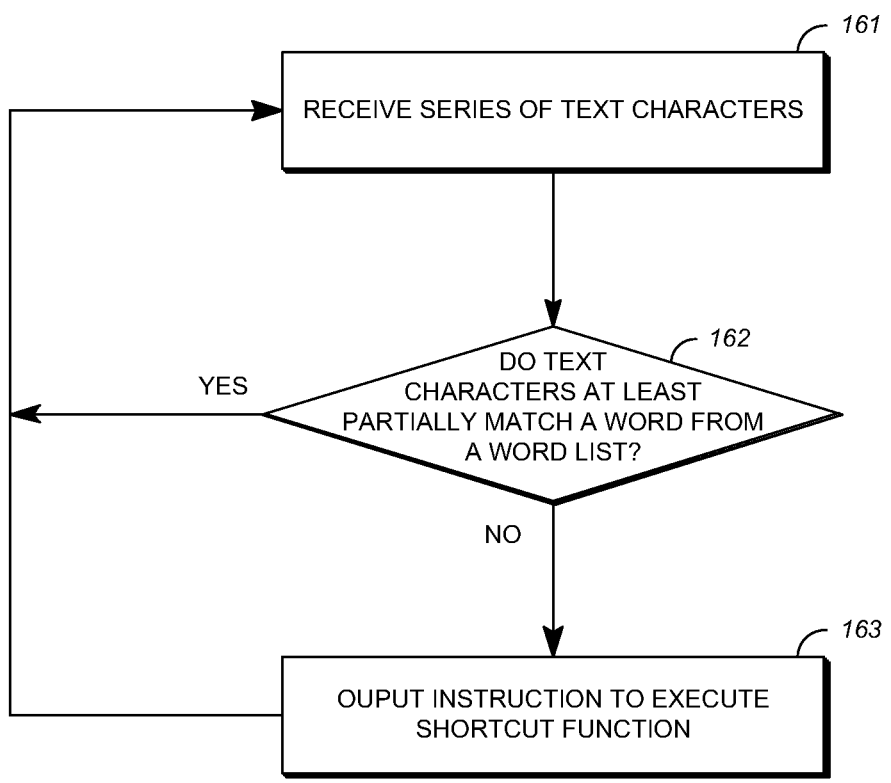
FIG. 7 is a flow chart showing a shortcut handling process according to the second example.

FIG. 7 is a flowchart showing a shortcut handling process 160 for correcting accidental shortcut usage that can be implemented by the system of FIG. 6. The shortcut handling process 160 can be implemented, for example, as a program implemented in the form of hardware or software that is executed by one or more computing devices. In one implementation, the shortcut handling process 160 is implemented in the form of the host application 38, and is executed by the host computing device 10. As an example, a program can include machine-readable instructions that are stored at a computer readable media such as the memory 22 or the storage device 32, and that when executed by a processor, such as the CPU 20, cause the host computing device 10 to perform the shortcut handling process 160. The shortcut handling process 160 can also be implemented using specialized hardware. As explained above, some computing devices may have multiple memories and multiple processors, and the steps of the shortcut handling process 160 can in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

At operation 161, a plurality of text characters is received. In one example, the plurality of text characters is received at the host computing device 10 in response to user input that is received at the input device 34 in response to user operation of the input device 34.

At operation 162, a determination is made as to whether the plurality of text characters at least partially matches one or more words from a word list. This can be performed, for example, by execution of the input analysis function of the input analysis component 146 using the contents of the input buffer 144 and the word list 148 as inputs. If the plurality of text characters does not at least partially match one or more words from a word list, the plurality of text characters is determined to represent a valid attempt to utilize shortcut commands, and the process proceeds to operation 163. If the plurality of text characters at least partially matches one or more words from the word list, the plurality of text characters is determined to not represent a valid attempt to utilize shortcut commands, the shortcut function is not executed, and the process returns to operation 161.

At operation 163, the shortcut function is executed, for example, by the shortcut component 150. The process then returns to operation 161 where additional text characters can be received for processing.

In the previous examples, systems for correcting accidental shortcut usage are described as being implemented at the host computing device 10. It should be understood, however, that the functions described herein can be implemented using one or more computing devices, each of which is operable to perform some or all of the functions described with respect to the host computing device 10.

Figure 8:
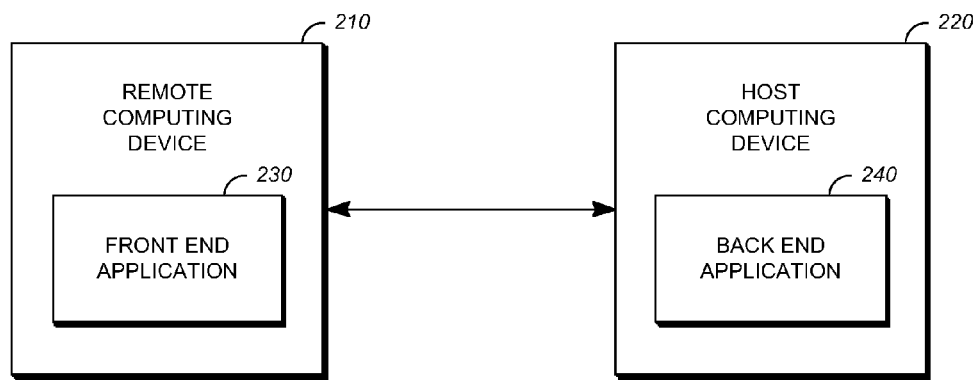
FIG. 8 is a block diagram showing an example of a client-server environment for implementation of correcting accidental shortcut usage.

FIG. 8 shows an example of a client-server environment in which a system for correcting accidental keyboard shortcut usage can be implemented. In this system, a remote computing device 210 is in communication with a server computing device 220, for example, via a network that allows signals and/or data to be transmitted between the remote computing device 210 and the server computing device 220. Each of the remote computing device 210 and the server computing device 220 can have a system configuration similar to that which was described in connection with the host computing device 10 of FIG. 2, including the CPU 20, the memory 22, and the one or more input devices 34.

In one implementation, the remote computing device 210 can include a front end application 230, and the server computing device 220 can include a back end application 240. In this example, the remote computing device 210 can be operable to receive input from a user at an input device, such as a keyboard, and generate an input signal based thereon. The front end application 230 can be operable to transmit the input signal to the back end application 240 of the server computing device 220.

The server computing device 220 can implement all or part of the systems shown in FIGS. 2 and 5. For example, the input buffer 44, the input analysis component 46, the word list 48, and the undo component 49 can be implemented at the back end application 240 of the server computing device 220. In some implementations, the shortcut component 42 and the undo buffer 45 are also implemented at the back end application 240 of the server computing device 220. In other implementations, any or all of the shortcut component 42, the undo buffer 45, and the undo component 49 can be implemented at the front end application 230 of the remote computing device 210, in which case, the input analysis component 46 can cause the back end application 240 to transmit an instruction from the server computing device 220 to the remote computing device 210 that instructs execution of the undo component 49 at the front end application 230 of the remote computing device 210.

In implementations where the system of FIG. 6 is implemented by the remote computing device 210 and the server computing device 220, the input signal 140 can be transmitted from the front end application 230 of the remote computing device 210 in the form of a plurality of text characters that is sent to the server computing device 220 from the remote computing device 210. The input buffer 144, the input analysis component 146, and the word list 148 can be implemented at the back end application 240 of the server computing device 220. The shortcut component 150 can be implemented at either the back end application 240 of the server computing device 220 or at the front end application 230 of the remote computing device 210, in which case, the input analysis component 146 can output instructions and transmit them from the back end application 240 of the server computing device to the front end application 230 of the remote computing device 210 to instruct execution of the shortcut component 150 or instruct that the shortcut component 150 is not to be executed.

It should be noted that these implementations are given by way of example, and the functions described herein can be distributed between the remote computing device 210 and the server computing device 220 in any manner.

As used herein, the term "computer" means any device of any kind that is capable of processing a signal or other information. Examples of computers include, without limitation, an application-specific integrated circuit (ASIC) a programmable logic array (PLA), a microcontroller, a digital logic controller, a digital signal processor (DSP), a desktop computer, a laptop computer, a tablet computer, and a mobile device such as a mobile telephone. A computer does not necessarily include memory or a processor. A computer can include programs, applications and/or software in the form of programmable code, micro code, and or firmware or other hardware embedded logic. A computer can include multiple processors which operate in parallel. The processing performed by a computer can be distributed among multiple separate devices, and the term computer encompasses all such devices when configured to perform in accordance with the disclosed embodiments.

Each of the computer-based systems described herein can be implemented in the form of multiple computers, processors, or other systems working in concert. As an example, the functions performed by the host computing device 10 can be distributed among a plurality of computers, each of which is capable of performing some or all of the functions that are described with respect to the host computing device 10.

Further, all or a portion of the implementations of the present disclosure can take the form of a computer program product accessible from, for example, a non-transitory computer-usable or computer-readable medium. The non-transitory computer-usable or computer-readable medium can be any tangible device that can, for example, contain, store, communicate, or transport the program for use by or in connection with any processor. The non-transitory computer-usable or computer-readable medium can be, for example, any type of disk including floppy disks, optical disks, CD-ROMs, magnetic or optical cards, application specific integrated circuits (ASICs), or any type of non-transitory media suitable for storing electronic instructions, and each coupled to a computer system bus. For example, any or all of the shortcut handling process 50, the input analysis process 60, or the shortcut handling process 160 can be embodied as computer executable instructions that are stored, for example, at the memory 22 of the host computing device 10 and can be executed at the CPU 20 to cause execution of any or all of the previously discussed operations.

It is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method, comprising:
receiving, by a computing device, an indication of a plurality of alphanumeric text characters, wherein at least one character from the plurality of alphanumeric text characters indicates a shortcut for a function of an application, and wherein the application is in a first state;
determining, by the computing device and based on the at least one character from the plurality of alphanumeric text characters, the function of the application;
executing, by the computing device, the function of the application, wherein, after the function is executed, the application is in a second state; and
responsive to determining, by the computing device, that the plurality of alphanumeric text characters at least partially matches a word from a word list, executing, by the computing device, an undo function of the application to return the application to the first state.

2. The method of claim 1, wherein the word list comprises a plurality of words determined based on data associated with the application.

3. The method of claim 1, wherein executing the undo function of the application comprises:
   outputting, by the computing device and for transmission to a remote computing device, an instruction to cause the remote computing device to execute the undo function of the application.

4. The method of claim 1, wherein the computing device receives the indication of the plurality of alphanumeric text characters from a remote computing device.

5. The method of claim 1, further comprising:
   determining, by the computing device, an amount of time that has elapsed since the computing device received the indication of the plurality of alphanumeric text characters,
   wherein executing the function of the application is responsive to determining that the amount of time exceeds a predetermined wait time.

6. The method of claim 1, wherein determining, by the computing device and based on the at least one alphanumeric character from the plurality of alphanumeric text characters, the function of the application comprises:
   outputting, by the computing device and for transmission to a remote computing device, the plurality of alphanumeric text characters; and
   receiving, by the computing device and from the remote computing device, an indication of the function of the application.

7. A non-transitory computer readable medium including program instructions executable by one or more processors that, when executed, cause the one or more processors to perform operations, the operations comprising:
   receiving an indication of a plurality of alphanumeric text characters, wherein at least one character from the plurality of alphanumeric text characters indicates a shortcut for a function of an application, and wherein the application is in a first state;
   determining, based on the at least one character from the plurality of alphanumeric text characters, the function of the application, wherein, after the function is executed, the application is in a second state;
   executing the function of the application; and
   responsive to determining that the plurality of alphanumeric text characters at least partially matches a word from a word list, executing an undo function of the application to return the application to the first state.

8. The non-transitory computer readable medium of claim 7, wherein the word list comprises a plurality of words determined based on data associated with the application.

9. The non-transitory computer readable medium of claim 7, wherein the operations further comprise:
   outputting, for transmission to a remote computing device, an instruction to cause the remote computing device to execute the undo function of the application.

10. The non-transitory computer readable medium of claim 7, wherein the indication of the plurality of alphanumeric text characters is received from a remote computing device.

11. A computing system comprising:
    an input device; and
    one or more processors configured to:
       receive, from the input device, an indication of a plurality of alphanumeric text characters, wherein at least one character from the plurality of alphanumeric text characters indicates a shortcut for a function of an application, and wherein the application is in a first state;
       determining, by the computing device and based on the at least one character from the plurality of alphanumeric text characters, the function of the application;
       executing, by the computing device, the function of the application, wherein, after the function is executed, the application is in a second state; and
    responsive to determining, by the computing device, that the plurality of alphanumeric text characters at least partially matches a word from a word list, executing, by the computing device, an undo function of the application to return the application to the first state.

12. The computing system of claim 11, wherein the word list comprises a plurality of words determined based on data associated with the application.

13. The computing system of claim 11, wherein the one or more processors are further configured to:
    output, for transmission to a remote computing device, an instruction to cause the remote computing device to execute the undo function of the application.

14. The computing system of claim 11, further comprising:
    a remote computing device; and
    a host computing device,
    wherein the remote computing device includes the input device,
    wherein the host computing device includes the one or more processors, and
    wherein the host computing device receives the indication of the plurality of alphanumeric text characters from the remote computing device.

* * * * *